A. E. BROWN.
MEANS FOR DETERMINING THE WEIGHT OF LOADS.
APPLICATION FILED JUNE 15, 1908.
932,109.
Patented Aug. 24, 1909.
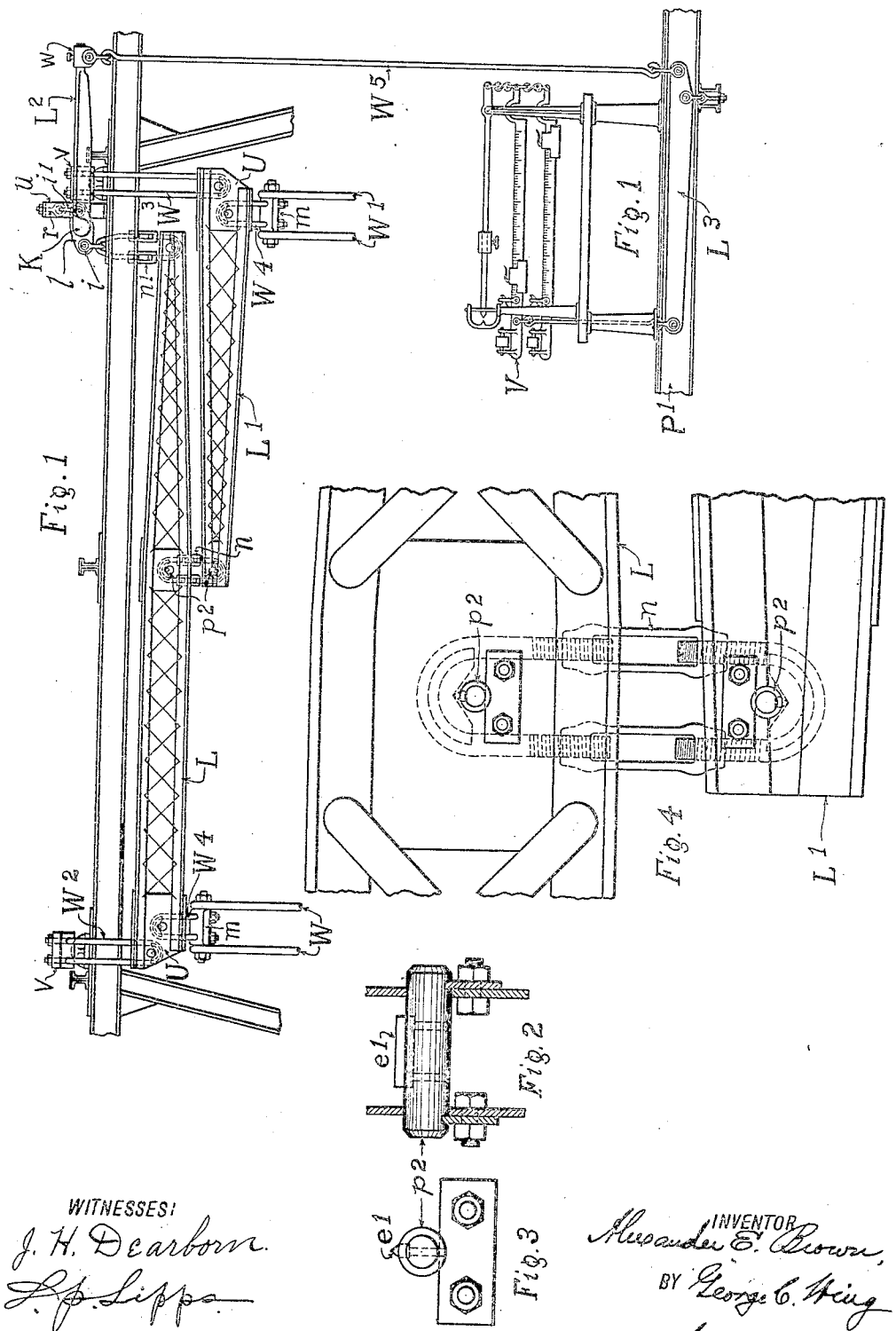

UNITED STATES PATENT OFFICE.

ALEXANDER E. BROWN, OF CLEVELAND, OHIO, ASSIGNOR TO THE BROWN HOISTING MACHINERY COMPANY, OF CLEVELAND, OHIO.

MEANS FOR DETERMINING THE WEIGHT OF LOADS.

932,109.

Specification of Letters Patent.   Patented Aug. 24, 1909.

Application filed June 15, 1908.   Serial No. 438,678.

*To all whom it may concern:*

Be it known that I, ALEXANDER E. BROWN, of Cleveland, in the county of Cuyahoga and State of Ohio, have invented a new and useful Means for Determining the Weight of Loads; and I do hereby declare the following to be a full, clear, and exact description of the same, reference being had to the accompanying drawings as a part of the specification, wherein the same parts in every instance are designated by the same letters.

My invention relates to weighing apparatus generally, but, more particularly, to the class of such apparatus employed in determining the weight of large and heavy bulks, such, for instance, as in the process of filling cars or other general transportation mediums, with ore, coal or like gross material, usually taken from dump piles on docks or in storage yards, or from vessels when it is difficult, by following the rude methods in use, to accurately determine, in the first instance, the precise weight that each car or other receptacle is given. In such cases the general practice has been to simply estimate this weight according to the number of bucket charges that are emptied into the car, at the risk, of course, of either over or underfilling the car, and, at the necessity of a special movement of the latter, after loading, to yard-scales to obtain the weight more precisely. To overcome these disadvantages I have, as a fact, devised an arrangement or combination of a weighing apparatus and a bin or bunker suspended therefrom from which the cars are severally filled, and their loads determined at the same process. In this arrangement the bin is adapted to carry a supply for several cars, and is suspended from the cross- or compound-levers of a scale, whereby its contents are first weighed, and, also, in effect, after each load is withdrawn, so that the difference will at once, indicate the weight of the load itself. The weights thus involved and that are to be suspended from the scale-levers, in this particular arrangement, are perhaps the maximum of weights such levers are called upon to sustain, and, although the details of a scale or weighing apparatus, that constitutes the present invention, are equally applicable to any apparatus of such nature where the pivotal bearings of compound levers are to be correctly located or adjusted, and whether the receptacle of the main load is suspended from the levers, or is otherwise supported thereby, I have nevertheless used the former type of weighing apparatus in the drawings, to illustrate said invention, in the more specific application of the same that is indicated.

In said drawings Figure 1 is a side view of a system of compound levers from which a bin or bunker may be suspended. Fig. 2 represents a special form of knife-edge bearings employed in their pin-seats. Fig. 3 is an end view of Fig. 2 and Fig. 4 is an enlarged view of said knife-edge bearings when in said seat in their respective places in the levers of a given system, and connected together by links.

The system of levers referred to is of course held and sustained in its operative position by a suitable frame structure of which P' indicates a lower beam member carrying a set of scales having an upper scale-beam V. An actuating lever $L^3$ pivotally engages said beam P', with its longer arm flexibly or jointedly connected, by a rod, to the said scale-beam V, and its shorter arm, likewise connected, by a rod $W^5$, to an adjustable or sliding nose-piece $w$, on the outer extremity or arm of a torsion-lever $L^2$. Said lever $L^2$, in its turn, is firmly attached near its inner end, like a crank, to a shaft or shaft-like part K that extends at right angles or cross-wise of said lever $L^2$, and has opposite lugs or cross-levers $l, l$, one of which is pivotally attached to a standard that is firmly attached to the top of said frame structure and the other and opposite lug of said lugs pivotally connected to the lever L, as hereinafter explained.

L and L' are oppositely related compound or multiplying levers, which, together, span said supporting structure from which they depend. Said levers are shown as lattice girders, and are, in turn, pivotally hung from the upper horizontal member of said structure, as shown, by suspender rods $W^2$ and $W^3$ that pass around pivot bearings at U in the levers and are secured above to socket-castings $v$. Near and between the points U in said levers are shown, in each case, similarly connected loops, or suspender rods $W^4$, extending downwardly and fastened to cross-blocks, or castings $m$ to sustain the downwardly extending supporting rods W and W' that are to engage and support a material-receiving bin or hopper below.

From the points of their attachment and support above described the levers L and L' extend inwardly, one beneath the other, at or near the middle point of the span, where they are linked together in the manner to be described. The uppermost lever L, however, is longer than L² and extends substantially across the span to a point beneath the inner of said lugs or parts $l$, on the shaft K. Here it is pivotally connected to said lug, by a link $n'$, through a clevis $i$. The other companion lug $l$, on the opposite side of K at this point is correspondingly connected to the standard $u$ by a clevis $i'$, and an eye-bolt $r$.

The supporting connections upon which the levers severally depend, in the most efficient constructions, are knife-edge bearings, in each instance. In the present invention such bearings are used, in the direct connection described between the levers L and L². Where heavy load weights are to be sustained as in the special apparatus supposed, such bearings should also not only be as indurate as practicable, but of extreme, or very considerable linear dimensions, and, in order to obtain and be assured of a high degree of accuracy in the operation of a given apparatus, it is essential that the distances between said common or direct bearing points of the levers L and L² and their separate bearing points, be located or fixed with great exactness. It is the main office and purpose of my present invention to provide a form of knife-edge bearing for uses in the connections above referred to that shall enable this distance to be so fixed. To this end I seat the knife-edge bearings $e'$, $e'$, for the direct connections between L and L² just described, in and as projecting longitudinally above cross-pins $p^2$, that are adapted to be inserted, and rest respectively, one above the other, in and cross-wise of said levers at or near the middle point of their span. Said bearings when thus seated, should be radial of their pins, and the pins themselves be loosely fitted in their places in order that they may be rotated therein, and by the revolution in the one direction or the other, carry the knife-edge bearing to the desired distance nearer or farther from the pivot at the other end of the lever, when it should be permanently fixed in place. This may be done, as indicated in the drawings, by keeper-plates that engage grooves, provided for the purpose on the under side of the pins and which are bolted to the levers when the pins have been revolved to the desired degree, or by any other appropriate means. Said knife-edges $e'$ and their bearings are united by links $n$ that complete the connection between the levers at the point in question.

Having thus explained my said invention, what I claim and desire to secure by Letters Patent, is—

1. In a weighing apparatus the combination of a lever-member thereof, and a knife-edge bearing therefor, radially seated in a revolubly adjustable pin, provided for the purpose, that is located in and transversely of said member, substantially as shown and described.

2. In a weighing apparatus, the combination of oppositely arranged and overhanging levers, revolubly adjustable pins located in and transversely of said levers near the middle point of their span, knife-edge bearings radially seated in said pins, and links, in engagement with said bearings, that connect said levers one to the other, substantially as shown and described.

ALEXANDER E. BROWN.

In presence of—
RICHARD B. SHERIDAN,
L. P. LIPPS.